(12) United States Patent
Sudhir

(10) Patent No.: US 10,022,021 B2
(45) Date of Patent: Jul. 17, 2018

(54) COOKING APPARATUS

(71) Applicant: Sanandan Sudhir, Delhi (IN)

(72) Inventor: Sanandan Sudhir, Delhi (IN)

( * ) Notice: Subject to any disclaimer, the term of this patent is extended or adjusted under 35 U.S.C. 154(b) by 0 days.

(21) Appl. No.: 15/225,387

(22) Filed: Aug. 1, 2016

(65) Prior Publication Data

US 2016/0338547 A1    Nov. 24, 2016

Related U.S. Application Data

(63) Continuation-in-part of application No. 13/991,163, filed as application No. PCT/IN2011/000882 on Dec. 21, 2011, now Pat. No. 9,402,511.

(30) Foreign Application Priority Data

Dec. 21, 2010    (IN) .......................... 3051/DEL/2010

(51) Int. Cl.
*A47J 44/00*    (2006.01)
*A47J 36/02*    (2006.01)
*A47J 27/00*    (2006.01)

(52) U.S. Cl.
CPC ............. *A47J 44/00* (2013.01); *A47J 27/002* (2013.01); *A47J 36/02* (2013.01); *A47J 36/027* (2013.01)

(58) Field of Classification Search
CPC  A47J 44/00; A47J 36/02; A47J 27/002; A47J 36/027
USPC .......... 99/326, 331, 340, 357; 219/400, 411, 219/524, 680, 681, 683, 729
See application file for complete search history.

(56) References Cited

U.S. PATENT DOCUMENTS

| | | | | |
|---|---|---|---|---|
| 3,789,178 A | * | 1/1974 | Harhen | H05B 6/6408 219/683 |
| 3,965,325 A | * | 6/1976 | Hirai | F24C 7/008 219/739 |
| RE31,637 E | | 7/1984 | Yoshida | |
| 5,177,333 A | * | 1/1993 | Ogasawara | H05B 6/06 219/601 |
| 5,206,478 A | * | 4/1993 | Lee | H05B 6/763 174/382 |
| 5,466,912 A | * | 11/1995 | Dornbush | A47J 36/12 126/21 A |
| 5,821,507 A | * | 10/1998 | Sasaki | H05B 6/1227 219/622 |
| 6,011,249 A | * | 1/2000 | Chung | H05B 6/6411 219/685 |

(Continued)

OTHER PUBLICATIONS

USPTO Office Action dated Nov. 18, 2015 issued for Parent U.S. Appl. No. 13/991,163.

*Primary Examiner* — Thien S Tran
(74) *Attorney, Agent, or Firm* — D'Ambrosio & Menon, PLLC; Usha Menon

(57) ABSTRACT

The present disclosure relates to a cooking apparatus having a base; a cooking container configured on the base; and a top lid that is configured to cover the cooking container so as to allow multiple modes of cooking, wherein the top lid is coupled with at least one magnetron that acts as a source of microwaves, such that in at least a first configuration, covering of the top lid enables microwave cooking using the magnetron, and in at least a second configuration, the cooking container is used to enable any or a combination of induction, open flame, radiation, convection, and conduction cooking.

20 Claims, 16 Drawing Sheets

(56) References Cited

U.S. PATENT DOCUMENTS

| | | | |
|---|---|---|---|
| 6,559,882 B1* | 5/2003 | Kerchner | H05B 6/6435 219/506 |
| 6,680,467 B1 | 1/2004 | Whipple | |
| 6,815,644 B1 | 11/2004 | Muegge | |
| 2005/0236388 A1* | 10/2005 | Goranson | A21B 1/245 219/400 |
| 2007/0251936 A1 | 11/2007 | Nam et al. | |
| 2009/0139981 A1* | 6/2009 | Moon | A47J 37/0623 219/490 |
| 2009/0196964 A1* | 8/2009 | Verhelst | A47J 39/006 426/234 |
| 2009/0212044 A1* | 8/2009 | Stanton | A47J 27/62 219/682 |
| 2010/0301034 A1* | 12/2010 | Greenwood | F24C 7/082 219/400 |

* cited by examiner

COOKING APPARATUS

CROSS REFERENCE TO RELATED APPLICATIONS

This application is a continuation-in-part of and claims priority to U.S. Ser. No. 13/991,163 filed Apr. 9, 2014, which is a U.S. National Stage filing under 35 U.S.C. 371 of PCT application number PCT/IN2011/000882 filed on Dec. 21, 2011, claiming benefit of Indian application no. 3051/DEL/2010, filed Dec. 21, 2010, the contents of which are incorporated by reference herein.

FIELD OF INVENTION

The present disclosure relates to an apparatus and method for efficient cooking. More specifically, it relates to a cooking apparatus that uses multi-source of heating and can efficiently switch over between the multiple modes based on the discretion of the user.

BACKGROUND OF THE INVENTION

Traditional cooking in Asian countries, and particularly India, has almost unarguably involved open flame cooking. Almost all cuisines and culinary practices developed in these countries have relied on the open flame method of cooking. This method of cooking has been in practice since time immemorial and with changing times and tastes, people have generally developed new cooking methods but centered on the same open flame cooking technique. For instance, preliminary heating, pre-frying, and roasting spices before cooking in open flame and oil is practiced. Similarly, to provide dry, crisp external surface for the ingredients in the dish, main ingredients are cooked in open flame before boiling or heating it with higher water content for complete cooking.

Even in the United States and other developed countries, induction cooking has been used for many years, wherein induction cooking is similar to other forms of cooking in that it uses a heated cooking vessel such as a pot or a pan to transfer heat to the food contained in the vessel. Induction cooking differs in that the vessel itself is the source of the heat, receiving its energy through electro magnetic radiation, which creates the heat in the walls of the vessel. The heat then reaches the food, from the vessel walls inward.

Even with the advent of modern cooking techniques, and specially the microwave technique, a substantial number of house-holds still prefer the open flame/induction cooking as their sole cooking technique. Such modern cooking techniques has definitely made the modern day cooking fast, easy, cost & time efficient, but, in public minds, still is not able to match up with the goodness of a traditional open flame cooking.

These modern cooking techniques depend mostly on an electrical supply as the power source. With a fluctuating electrical supply in most parts of any developing nation, including India, the primary concern in a user's mind is a loss of time and other resources, if and when, the electrical supply gets off in the course of cooking. Indian households also find it difficult to do an investment in money and space that separate cooking instruments dedicated to different styles of cooking might entail on them.

There is therefore a need in the art to provide for a cooking apparatus that combines the benefits of both open flame/induction/convection/conduction and other modern cooking techniques into a single apparatus, giving user a much desired advantage of savoring his taste buds by dishes made from different styles of cooking as well as saving cost and space.

Objects of the Invention

An object of the present disclosure is to provide a cooking apparatus that combines benefits of both open flame/induction/convection/conduction and other modern cooking techniques into a single apparatus.

Another object of the present disclosure is to provide a cooking apparatus that has multiple sensors configured to monitor state of cooking, control cooking conditions, time of cooking, control time of use of induction based cooking vs. microwave cooking, among many other configurable parameters.

Yet another object of the present disclosure is to provide a curved induction coil that matches the form factor of a curved/round cooking container so as to allow effective microwave reflections for optimal cooking.

SUMMARY OF THE INVENTION

The present invention discloses an apparatus and method that combines traditional cooking (such as open flame/induction cooking) with modern cooking techniques (such as convection cooking, conduction cooking, radiation cooking and microwave cooking). It not only allows traditional cooking steps that take place in open flame/induction but also gives the user an option to switch over to other cooking techniques to complete the cooking.

In an aspect, the present disclosure relates to a cooking apparatus comprising a base; a cooking container configured on the base; and a top lid that is configured to cover the cooking container so as to allow multiple modes of cooking, wherein the top lid is coupled with at least one magnetron that acts as a source of microwaves, such that in at least a first configuration, covering of the top lid enables microwave cooking using the magnetron, and in at least a second configuration, the cooking container is used to enable any or a combination of induction, open flame, radiation, convection, and conduction cooking.

In an aspect, the top lid includes a fan and a heater coil to enable convection and radiation based cooking from heat generated. In another aspect, heating of the heater coil enables heat to travel through conduction between the the top lid and the cooking container, enables convection through fan, and further enables natural radiation.

In another aspect, the cooking container is of a round shape so as to enable reflection of microwaves inside the cooking container and the top lid for efficient cooking. The cooking container can be supported by a curved induction coil that matches the profile of the round cooking container. In another aspect, the cooking container can be integrated with the base of the cooking apparatus.

In an aspect, the cooking apparatus can be configured to allow simultaneous and/or iterative use of any or a combination of induction, open flame, convection, conduction, radiation, and microwave cooking.

In another aspect, the magnetron forms part of an enclosure that comprises a plurality of vents for a fan that is configured in the enclosure. The top lid can be coupled with the enclosure by means of a hinge. The enclosure can include a temperature sensor that is configured to sense temperature thereof. In an aspect, the enclosure can include a display to indicate and/or enable control of any or a combination of temperature, time, and a cooking parameter related to the cooking apparatus or a part thereof.

In an aspect, the cooking apparatus can be configured as a remotely operable apparatus through any or a combination of Internet, Wi-Fi, Bluetooth, Zigbee, and Near-Field Communication (NFC). The top lid can include a moisture sensor configured to sprinkle water based on level of moisture between the top lid and the cooking container during the cooking. The top lid can further include a thermal sensor that enables generation and presentation of a thermal map that defines cooking state of individual ingredients being cooked. In an aspect, the top lid can further include an IR camera to enable viewing of individual ingredients being cooked.

In another exemplary embodiment, the top lid can be coupled with two more magnetrons so as to give additional power to the top lid for microwave action. The magnetron can be water-cooled or air-cooled, and weight of the magnetron can be configured so as to counter-balance the weight of the cooking apparatus so as to minimize load on a handle of the top lid.

The cooking apparatus can further include a choke mechanism to avoid leakage of microwaves.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

Figure 1A:
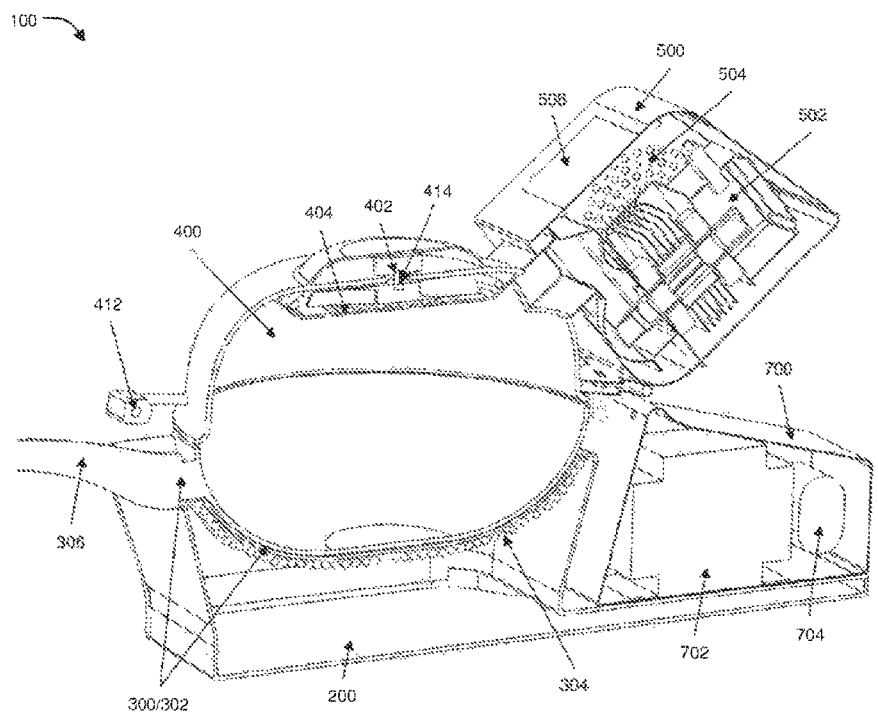
FIGS. 1A to 1H illustrate exemplary representations of proposed cooking apparatus according to an embodiment of the present invention.

For a better understanding of the present invention, together with other and further objects, advantages and capabilities thereof, reference is made to the following disclosure and appended claims in connection with the above-described drawings.

The present invention discloses an apparatus and method that combines traditional cooking (such as open flame/induction cooking) with modern cooking techniques (such as convection cooking, conduction cooking, radiation cooking and microwave cooking). It not only allows traditional cooking steps that take place in open flame/induction but also gives the user an option to switch over to other cooking techniques based on other sources of heat such as convection/radiation/microwave to complete the cooking.

In an aspect, the present disclosure relates to a cooking apparatus comprising a base; a cooking container configured on the base; and a top lid that is configured to cover the cooking container so as to allow multiple modes of cooking, wherein the top lid is coupled with at least one magnetron that acts as a source of microwaves, such that in at least a first configuration, covering of the top lid enables microwave cooking using the magnetron, and in at least a second configuration, the cooking container is used to enable any or a combination of induction, open flame, radiation, convection, and conduction cooking.

In an aspect, the top lid includes a fan and a heater coil to enable convention and radiation based cooking from heat generated by the heater coil. In another aspect, heating of the heater coil enables heat to travel through conduction between the top lid and the cooking container, enables convection through fan, and further enables natural radiation.

In another aspect, the cooking container is of a round shape so as to enable reflection of microwaves inside the cooking container and the top lid for efficient cooking. The cooking container can be supported by a curved induction coil that matches the profile of the round cooking container. In another aspect, the cooking container can be integrated with the base of the cooking apparatus.

In an aspect, the cooking apparatus can be configured to allow simultaneous and/or iterative use of any or a combination of induction, open flame, convection, conduction, radiation, and microwave cooking.

In another aspect, the magnetron forms part of an enclosure that comprises a plurality of vents for a fan that is configured in the enclosure. The top lid can be coupled with the enclosure by means of a hinge. The enclosure can include a temperature sensor that is configured to sense temperature thereof. In an aspect, the enclosure can include a display to indicate and/or enable control of any or a combination of temperature, time, and a cooking parameter related to the cooking apparatus or a part thereof.

In an aspect, the cooking apparatus can be configured as a remotely operable apparatus through any or a combination of Internet, Wi-Fi, Bluetooth, Zigbee, and Near-Field Communication (NFC). The top lid can include a moisture sensor configured to sprinkle water based on level of moisture between the top lid and the cooking container during the cooking. The top lid can further include a thermal sensor that enables generation and presentation of a thermal map that defines cooking state of individual ingredients being cooked. In an aspect, the top lid can further include an IR camera to enable viewing of individual ingredients being cooked.

In another exemplary embodiment, the top lid can be coupled with two more magnetrons so as to give additional power to the top lid for microwave action. The magnetron can be water-cooled or air-cooled, and weight of the magnetron can be configured so as to counter-balance the weight of the cooking apparatus so as to minimize load on a handle of the top lid.

The cooking apparatus can further include a choke mechanism to avoid leakage of microwaves.

It is to be appreciated that induction-cooking systems have been known for many years but have gained popularity recently due to their many advantages over other types of cooking systems. Like a traditional electric stove, an induction stove uses electricity to generate heat. However, instead of heating a resistive element (such as a coil of metal) by passing electric current through it, an induction stove generates an oscillating magnetic field that causes the cooking container itself to be heated. The term "cooking container" as used throughout this specification, refers to any pot, vessel, pan, skillet, and/or any other suitable cooking container or hardware in which food or other material is placed to be heated on a stove.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference to FIGS. 1-6, a cooking apparatus 100 has been illustrated, wherein the apparatus 100 includes base 200, a cooking container 300 configured on the base 200, and a top lid 400 that is configured to cover the cooking container 300 so as to allow multiple modes of cooking, wherein the top lid 400 is coupled with at least one magnetron 502 that forms part of an enclosure 500 and acts as a source of microwaves. In implementation of the proposed cooking apparatus 100, in at least a first cooking configuration, covering of the top lid 400 enables microwave cooking using the magnetron 502, and in at least a second configuration, the cooking container 300 is used to enable any or a combination of induction, open flame, radiation, convection, and conduction cooking.

In an aspect, the base 200 provides a heat source to enable induction or open flame cooking. In another aspect, radiation, convection, and conduction may be enabled both from top to bottom direction as well from the bottom to the top direction.

In one aspect, top lid (also referred to as top cover or top portion hereinafter) 400 can simply cover the cooking container 300 so as to allow any of the induction, open flame, radiation, convection, or conduction cooking, whereas in another aspect, covering of the cooking container 300 by the top lid 400 can initiate the microwave action depending on user instructions and apparatus configuration.

In an aspect, the top lid 400 can include a fan 402 and a heater coil 404 to enable convection and radiation based cooking using the heat that is generated by the heater coil 404. In another aspect, heating of the heater coil 404 enables heat to travel through conduction between the top lid 400 and the cooking container 300, along with enabling convection through the fan 402, and further enabling natural radiation.

Figure 1B:
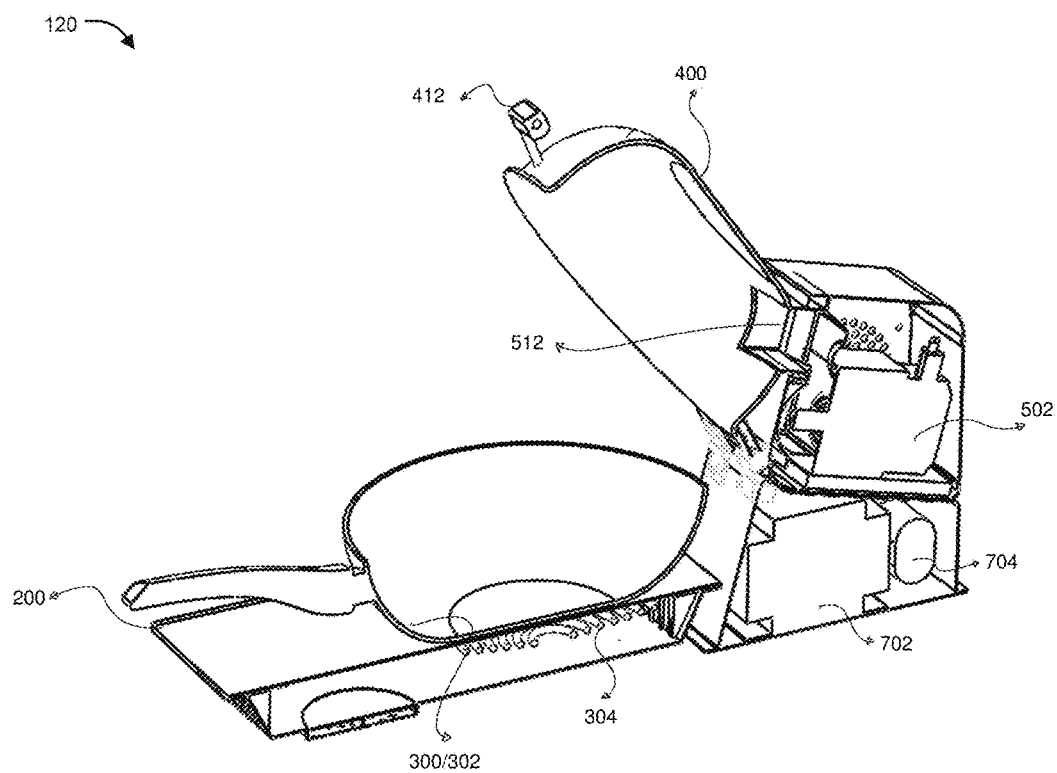
Figure 1C:
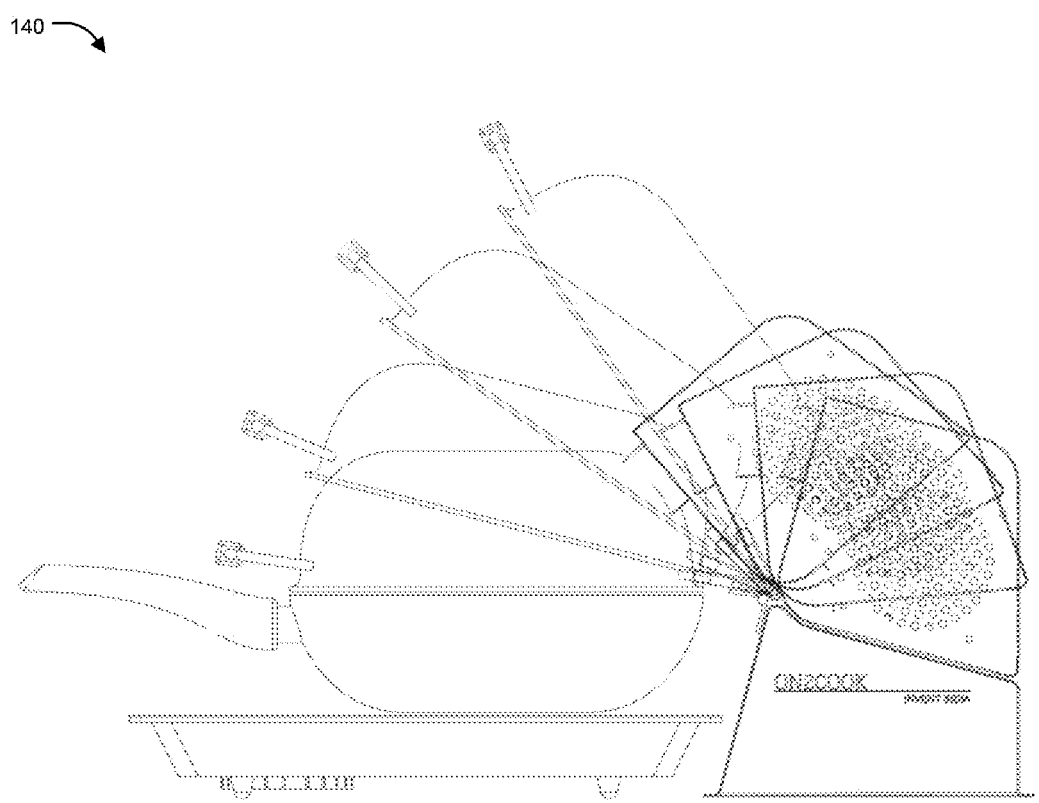
Figure 1D:
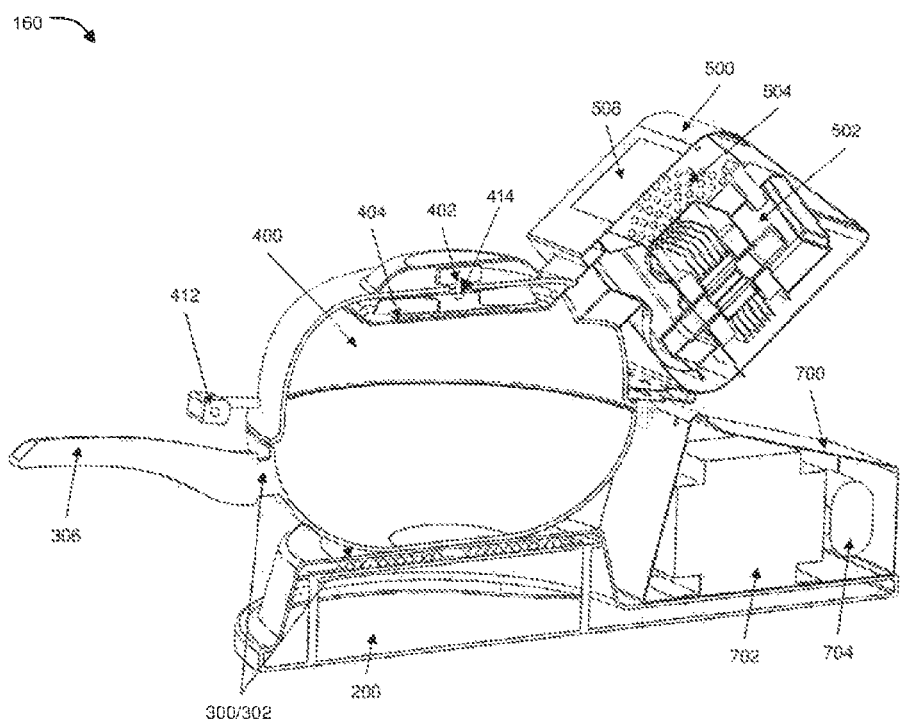
Figure 1E:
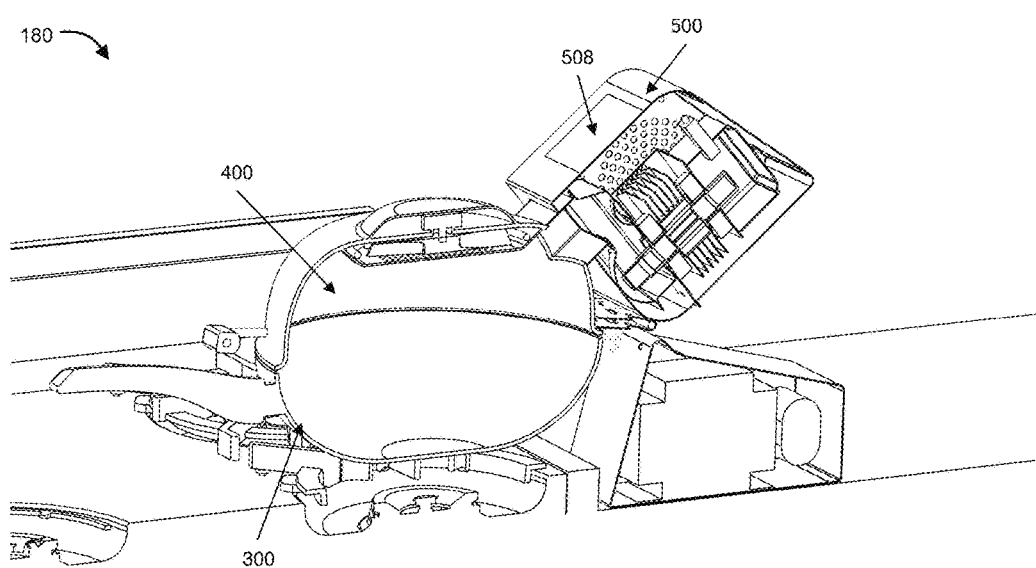
Figure 1F:
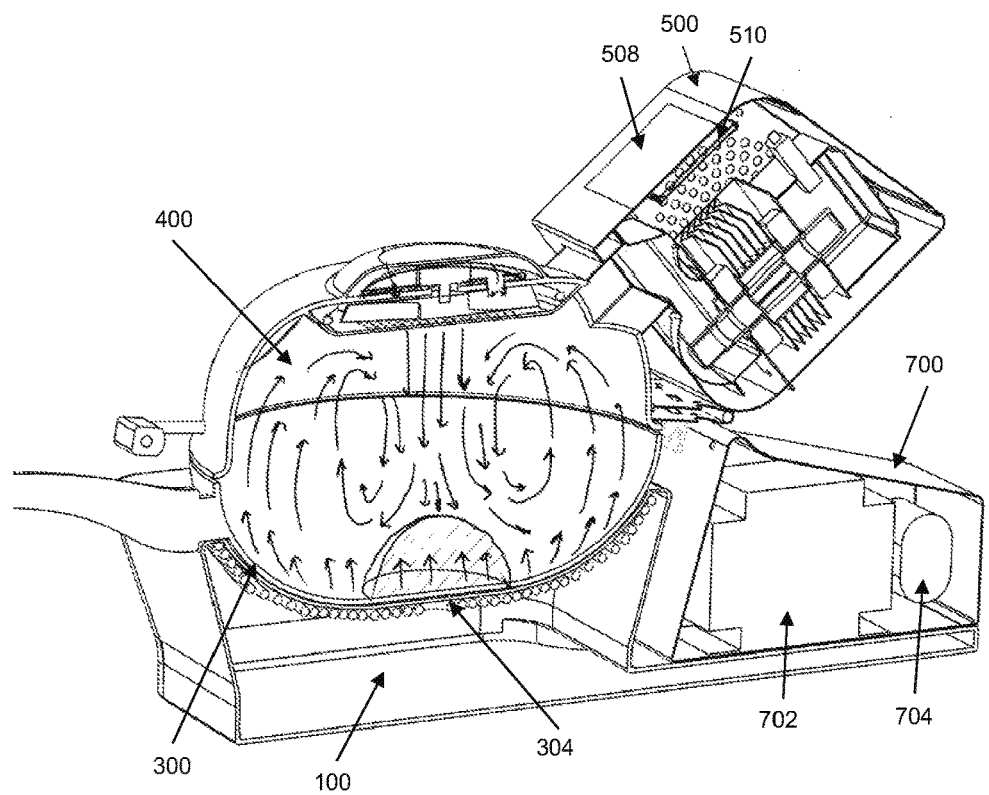

In an exemplary embodiment, cooking container 300 can be of a round shape (as shown in FIG. 1B as 302) so as to enable reflection of microwaves inside the cooking container 300 and the top lid 400 for efficient cooking. In another exemplary embodiment, the cooking container 300 can be supported by a curved induction coil 304 that matches the profile of the round cooking container 300. In yet another exemplary embodiment, the cooking container 300 can be integrated with the base 200 of the cooking apparatus 300. For instance, the cooking container 300 can be permanently fixed with the base 200 itself so that the cooking ingredients (such as rice, vegetables, etc) can be put into the container 300 for direct cooking. On the other hand, in an alternate embodiment, the base 200 can include or be permanently fixed with the induction coil 304 such that any container 300 (preferably matching the profile of the induction coil 304) can be placed on the coil 304 to enable the cooking. Post the cooking the container/pan 300 can be taken off and be replaced by any other pan.

In an aspect, the cooking apparatus 300 can be configured to allow simultaneous and/or iterative use of any or a combination of induction, open flame, convection, conduction, radiation, and microwave cooking.

In an aspect, the base 200 can incorporate means to provide the open flame or provide heat source for the induction plate.

In another aspect, the magnetron 502 forms part of the enclosure 500 that comprises a plurality of vents 504 for a fan (not shown) that is configured in the enclosure 500. The top lid 400 can be coupled with the enclosure 500 by means of a hinge 506. The enclosure 500 can further include a temperature sensor (not shown) that is configured to sense temperature thereof and take appropriate measures when the temperature exceeds a defined threshold. In an aspect, the enclosure 500 can include a display 508 to indicate and/or enable control of any or a combination of temperature, time, and a cooking parameter related to the cooking apparatus or a part thereof. In another aspect, with reference to FIG. 1F, display 508 can be operatively coupled with a Printed Circuit Board (PCB) 510 that can be capable to wired/wireless communication selected from any or a combination of Wi-Fi, Bluetooth, Zigbee, any other like connectivity so as to control working of the magnetron and/or remotely control the display 508 or for any other conceivable purpose. In another aspect, enclosure 500 can include a space/waveguide 512 (FIG. 1B) for emission of microwaves from the magnetron 502 to the top lid 400.

Figure 1G:
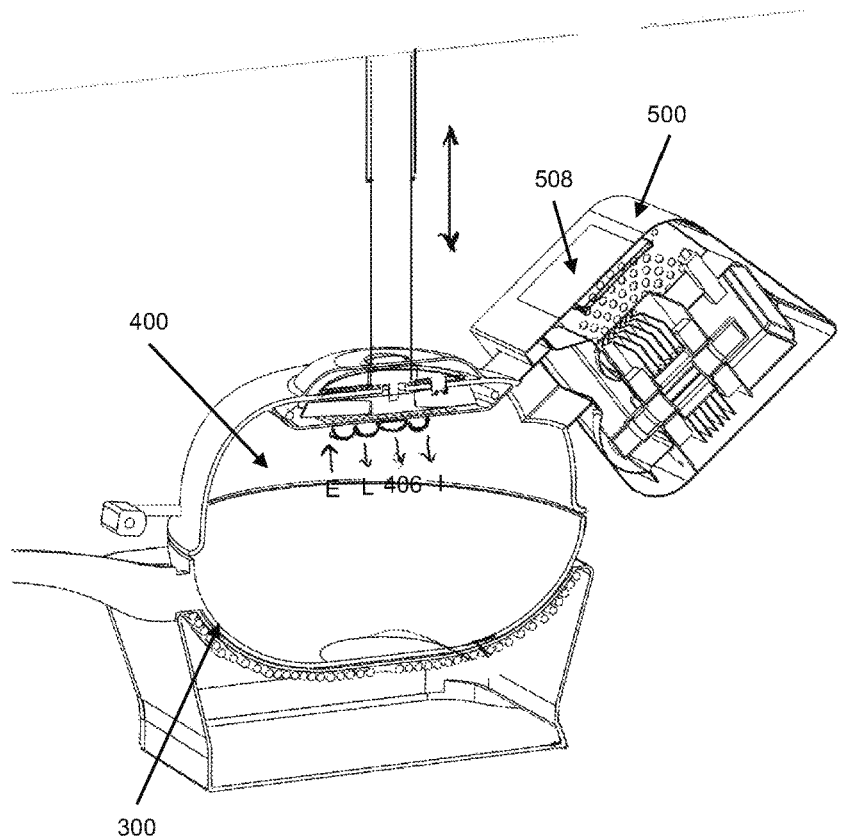

Apparatus 100 can further include an electrical connectivity portion 700 connected from the power source to the induction coil 304 that is configured at the base 200 of the apparatus 100. In another aspect, the electrical connectivity portion 700 can include any or a combination of a transformer 702 and a capacitor 704. It should be appreciated that any other form factor can be configured for the electrical connectivity portion 700 as it does not necessary need to be below the enclosure 500 (or adjacent to the base 200) and can also be, for instance, positioned at an upper portion of the wall and just come down as a wire/cable that can be used for power supply. Any other form factor or location can be used for configuring the electrical connectivity portion 700, all of which are well within the scope of the present disclosure. FIG. 1G illustrates an exemplary configuration of the connectivity portion 700. For instance, FIG. 1G shows multiple lids 400 of different sizes, shapes, or configurations that can be incorporated so as to match the form factor of the cooking container 300 (also referred to as Pan). Furthermore, as can be seen, it is also possible that connectivity portion 700 is not below the enclosure 500 and is actually fitted somewhere else (say fixed with a wall above the user). As shown, one or more lids 400 can also hang from the top along with the power coming from the top.

FIG. 1G also shows a plurality of sensors/components that can be configured in the top lid 400, say a light indication means (L), a moisture sensor 406, an ingredient condition indicating sensor/camera (I), or an exhaust (E).

Figure 1H:
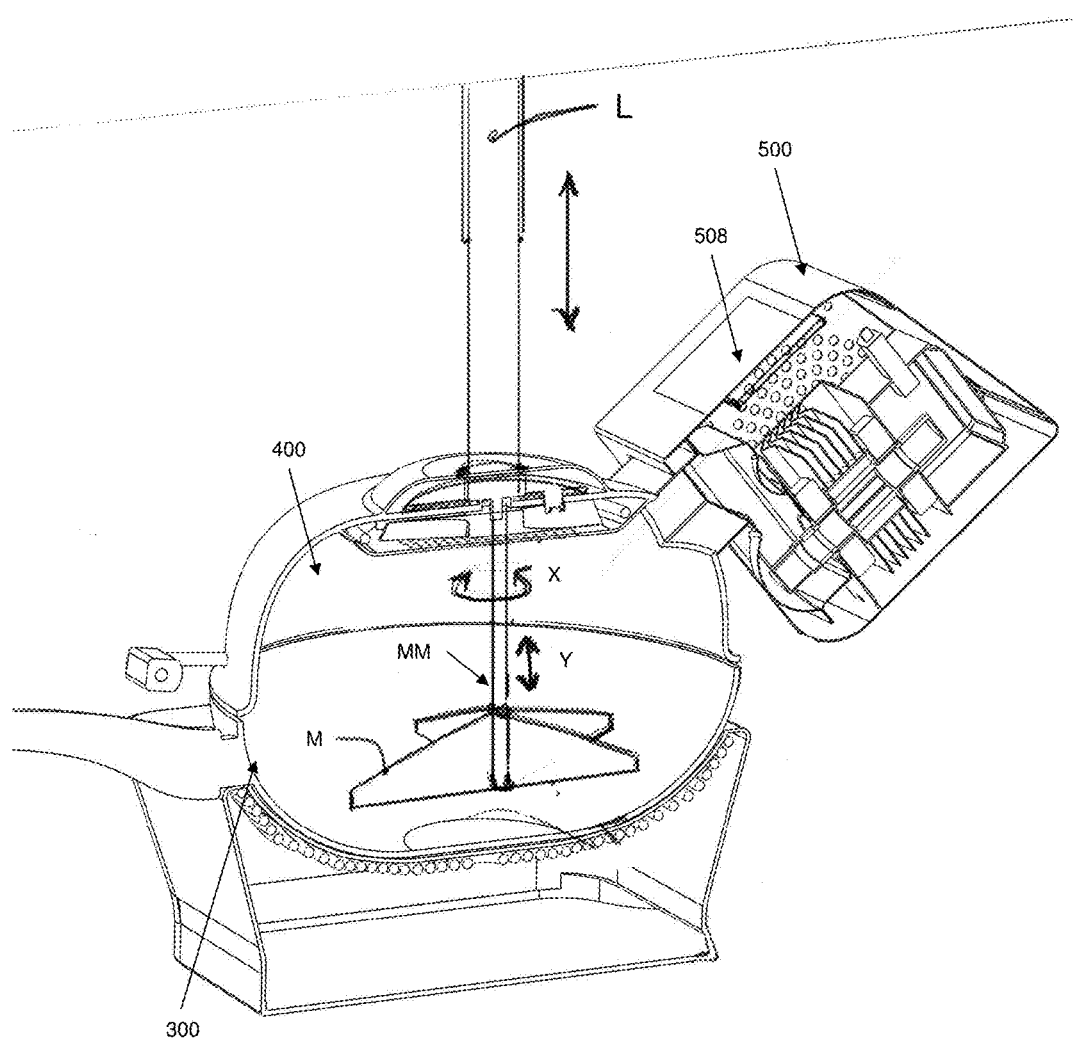

FIG. 1H illustrates yet another exemplary embodiment, where a flexible shaft (L) can be configured from the top to remove and/or cover the top lid 400 over the cooking pan/container 300. In an aspect, one or more mixer blades (M) can be configured to be so as to extend, through a member (MM) from the top lid 400 towards the cooking container 300 such that rotation of the member (MM) can enable rotation of the mixer blades (M), and wherein the member (MM) can be moved along with the Y axis (up or down).

In an aspect, the cooking apparatus 100 can be configured as a remotely operable apparatus through any or a combination of Internet, Wi-Fi, Bluetooth, Zigbee, and Near-Field Communication (NFC). The top lid 400 can include a moisture sensor 406 configured to sprinkle water based on level of moisture between the top lid 400 and the cooking container 300 during the cooking. The top lid 400 can further include a thermal sensor that enables generation and presentation of a thermal map that defines cooking state of individual ingredients being cooked. In an aspect, the top lid 400 can further include an IR camera to enable viewing of individual ingredients being cooked.

In another exemplary embodiment, the top lid 400 can be coupled with two more magnetrons 502A and 502B so as to give additional power to the top lid 400 for microwave action. The magnetron 502 can be water-cooled or air-cooled, and weight of the magnetron 502 can be configured so as to counter-balance the weight of the cooking apparatus 100 so as to minimize load on a handle 412 of the top lid 400.

It is further submitted that since the cooking container 300 becomes hot by means of the open flame/induction heat from below, as an inherent property of metals, it would radiate heat towards the food inside, getting the food cooked by conduction, convection, and radiation from the cooking container 300 (metal). Therefore, both in case of induction as well as open flame, the cooking container/vessel/pan is heated from below through conduction and radiation, and then the heat is passed through conduction to the food due to direct contact with the container 300, and also through convection by heating up of the air inside the container 300.

Figure 2:
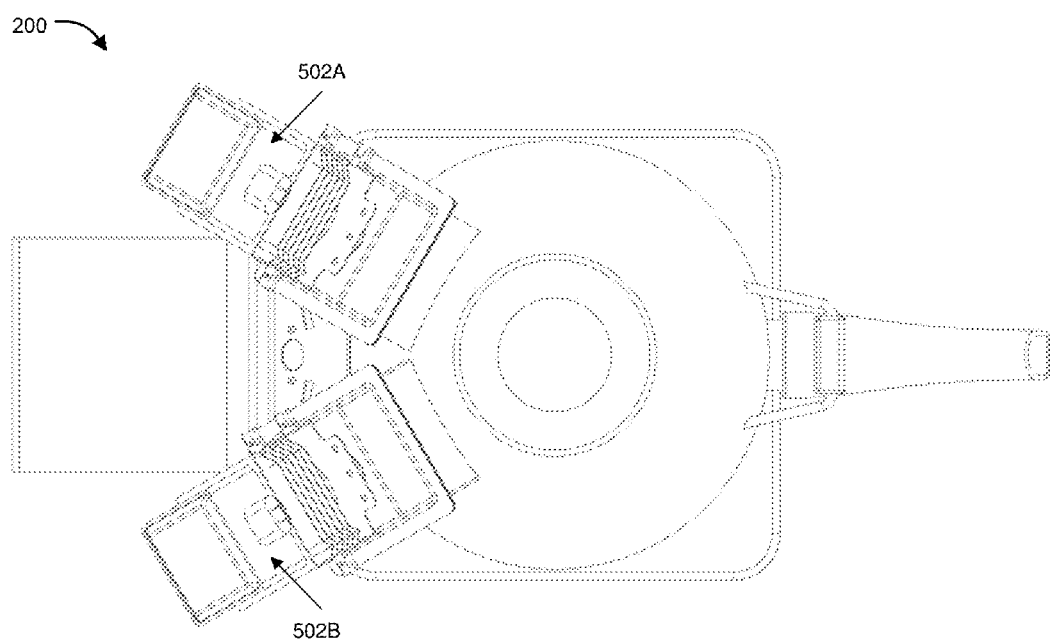
FIG. 2 illustrates an exemplary representation of the cooking apparatus having two magnetrons according to an embodiment of the present invention.

FIG. 2 illustrates an exemplary embodiment of the proposed cooking apparatus 100 with two magnetrons 502A and 502B, wherein the representation of FIG. 2 shows top view with 2 magnetrons 502A and 502B, which can collectively give additional power from the top. The magnetrons 502 can act as the microwave source and can either be water-cooled or air-cooled and can have the wattage from 500 Watts to 6000 Watts. In an aspect, weight of the magnetrons 502 can balance the weight of the apparatus 100 such that the weight on the handle of the top lid 400 is minimal.

Figure 3:
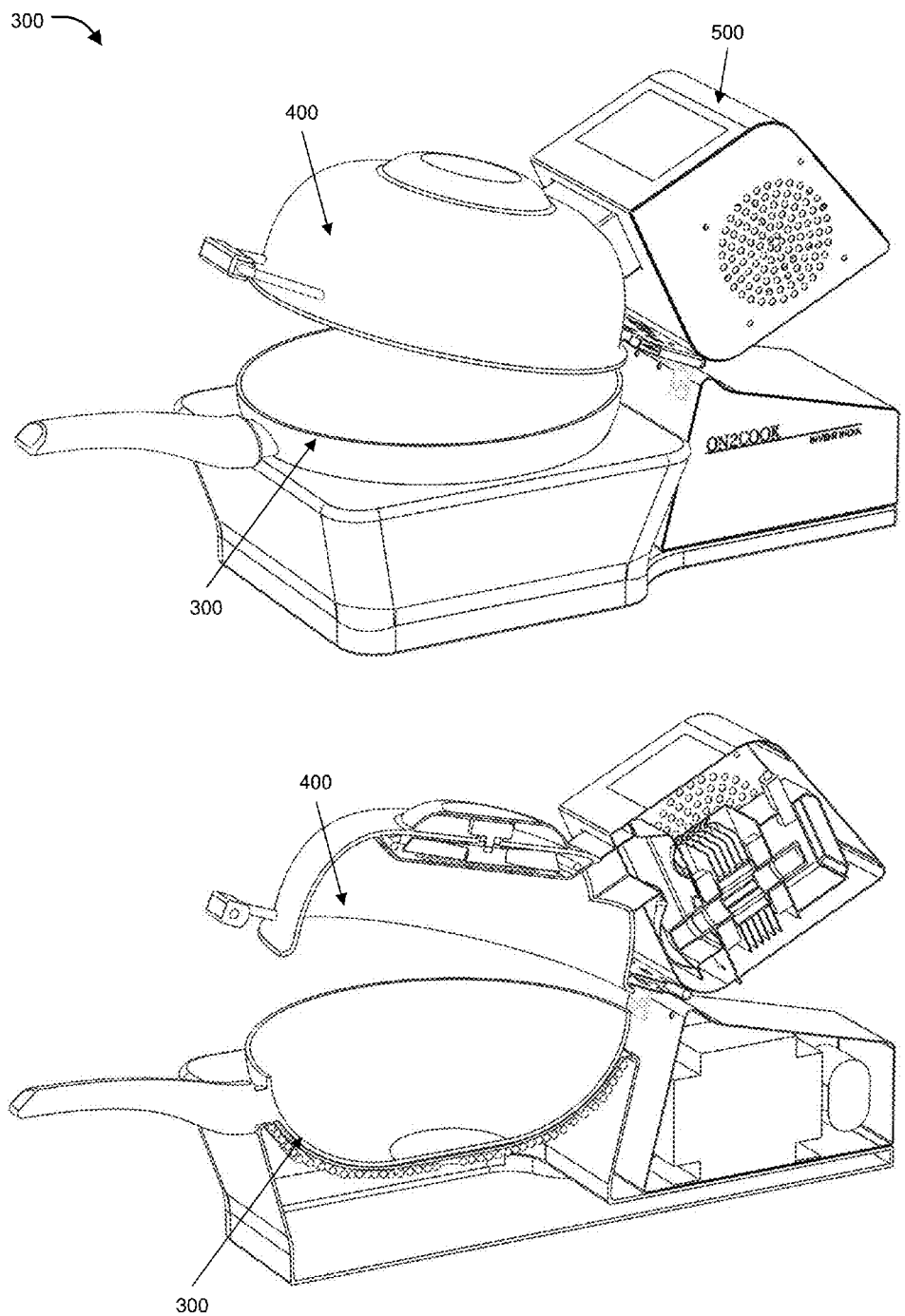
FIG. 3 illustrates yet another exemplary representation of the cooking apparatus showing detailed components of the top lid according to an embodiment of the present invention.

FIG. 3 illustrates additional exemplary representations of the proposed cooking apparatus in accordance with an embodiment of the present disclosure, wherein the cooking container can be Pan or can be rounded cooking container configured above an induction coil.

Figure 4A:
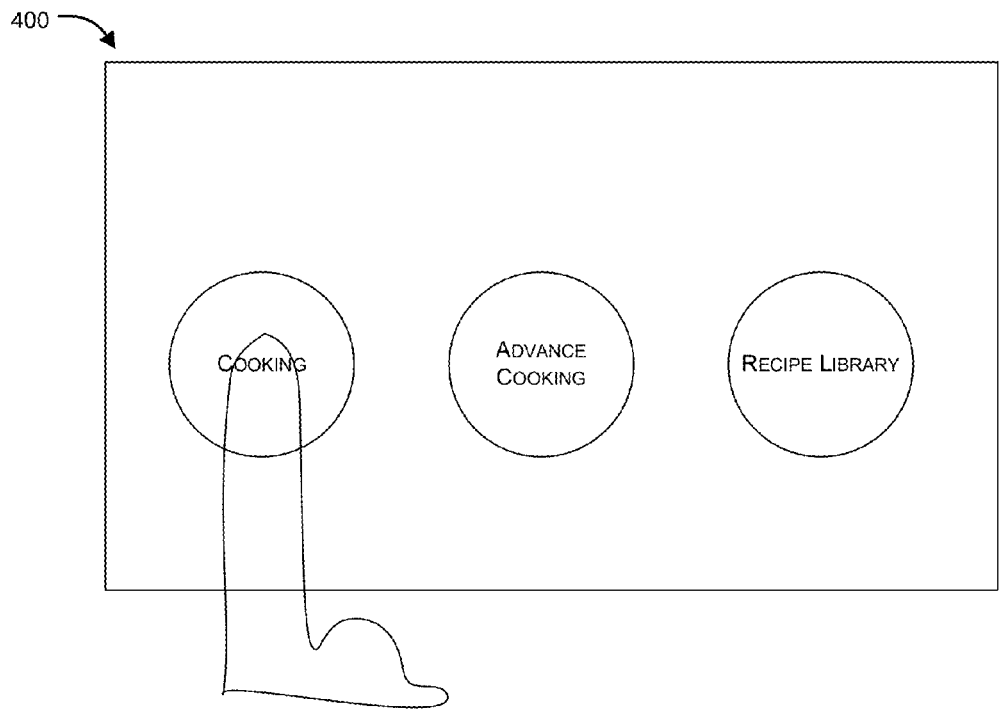
FIGS. 4A to 4C show various exemplary cooking control features provided on the display of the cooking apparatus according to an embodiment of the present invention.
Figure 4B:
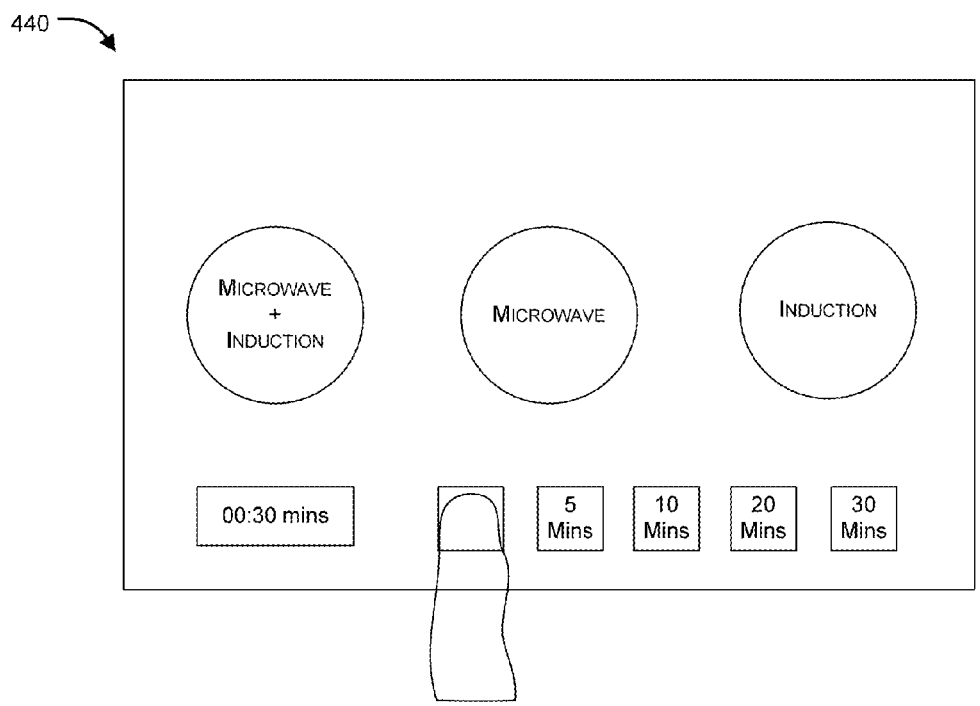
Figure 4C:
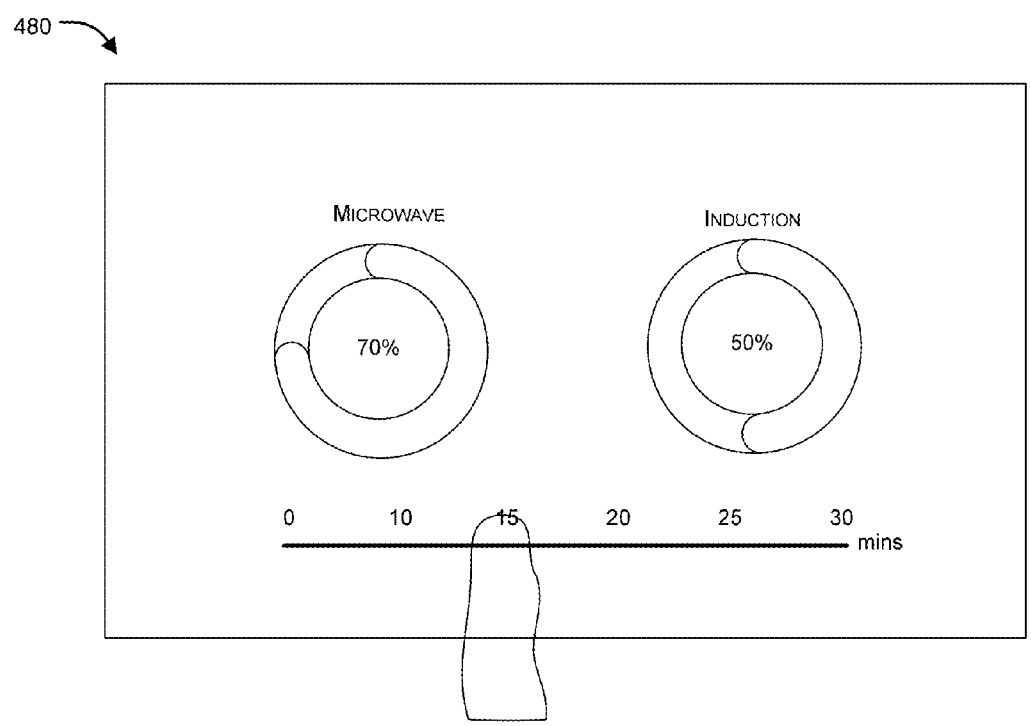

FIG. 4A illustrates an exemplary representation 400 of the display 508 showing multiple modes such as Cooking, Advance Cooking, and Recipe Library, wherein FIG. 4B shows an exemplary screenshot 440 once a user selects Quick Cooking as the option. FIG. 4B shows options such as whether the user would like to perform Microwave+ Induction based cooking, or only Microwave based cooking, or only Induction based cooking. The user can also be enabled to select desired time for each type of cooking option being presented. FIG. 4C shows an exemplary screenshot 480 when the user clicks on Advance Cooking option, wherein the user can select the extent of Microwave that is to be used when compared with extent of induction, along with setting of a time for which each or a combination of the types of cooking is to be performed. Such options/features and/or recommendations on the display are completely exemplary in nature and any other parameter display can be configured, all of which possible options are within the scope of the instant disclosure.

The cooking apparatus 100 can further include a choke 600 (Ref to FIGS. 6A to 6D) mechanism to avoid leakage of microwaves.

Figure 5A:
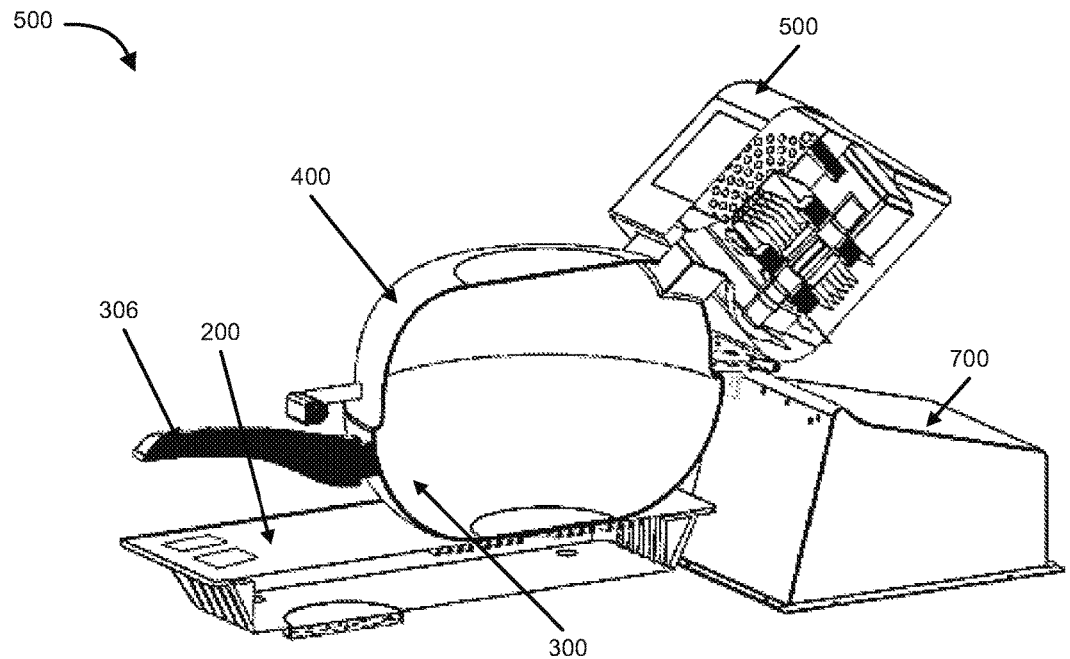
FIGS. 5A to 5D illustrate additional exemplary representations of the cooking apparatus showing a heater coil configured in the top lid of the apparatus according to an embodiment of the present invention.
Figure 5B:
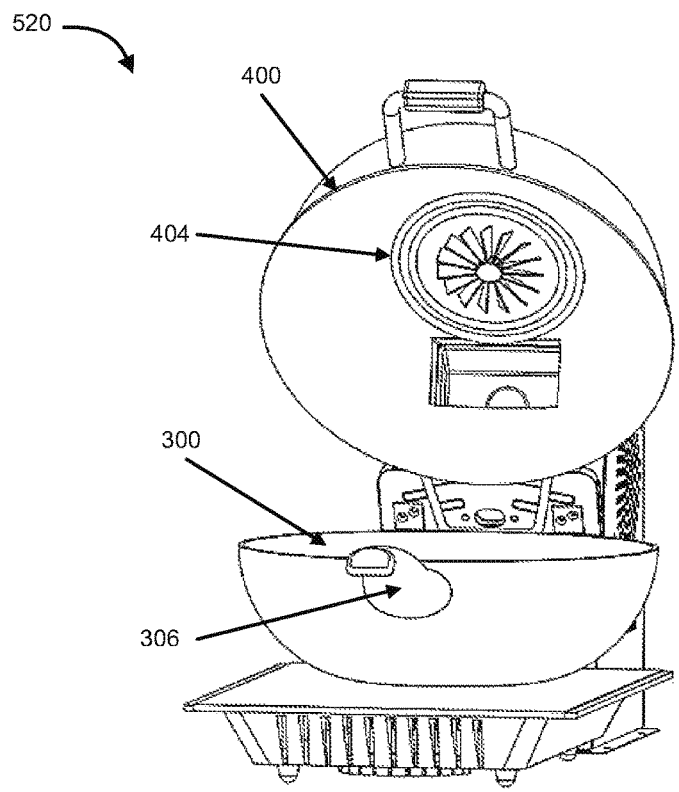
Figure 5C:
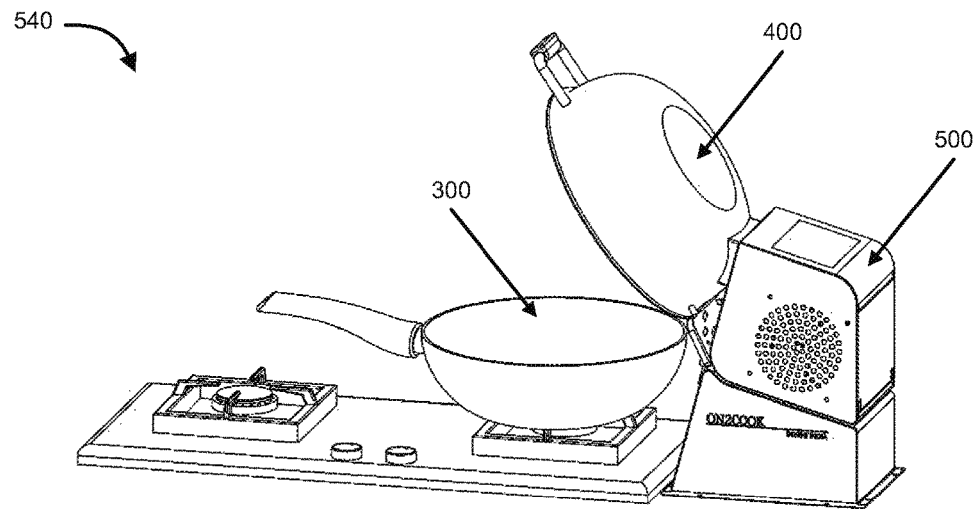
Figure 5D:
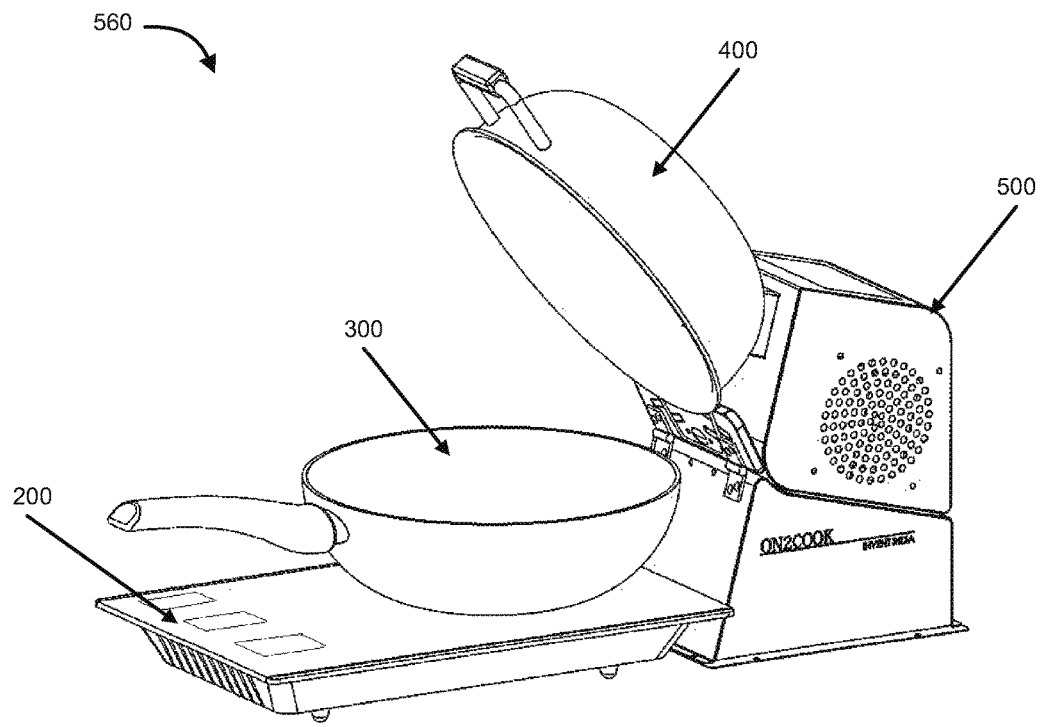
Figure 6A:
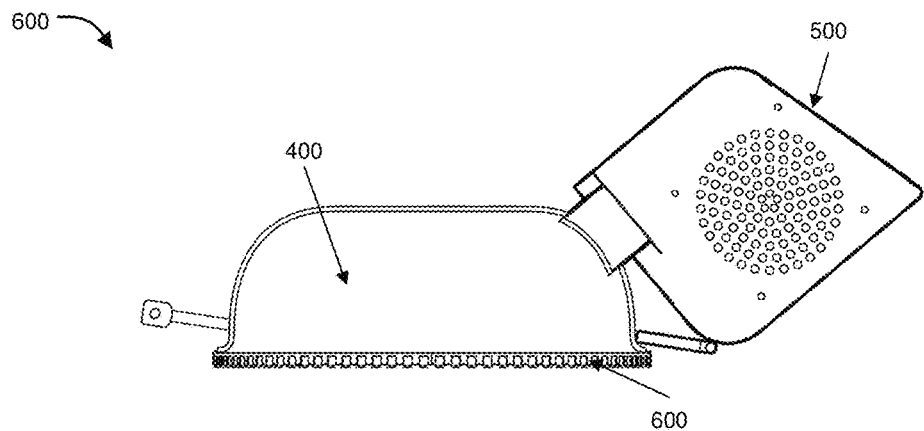
FIGS. 6A to 6D illustrate choke having a plurality of choke tips configured to prevent leakage of microwave according to an embodiment of the present invention.
Figure 6B:
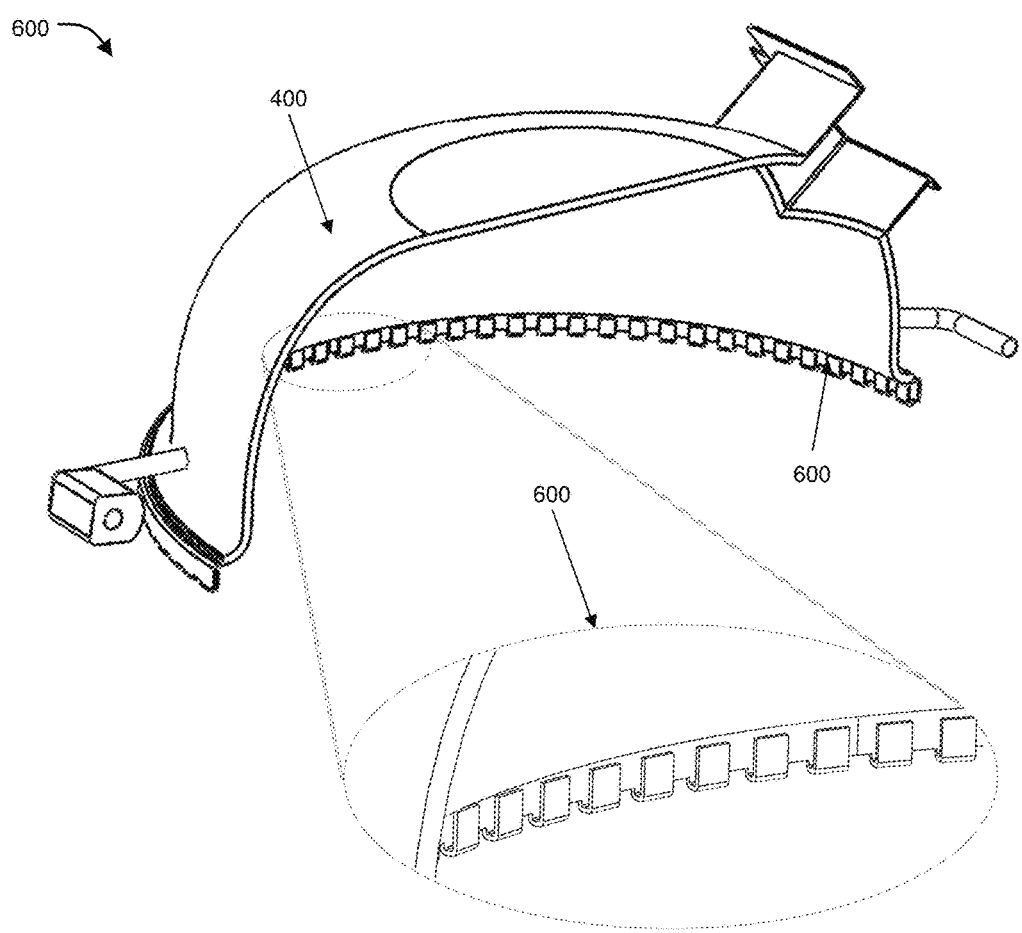
Figure 6C:
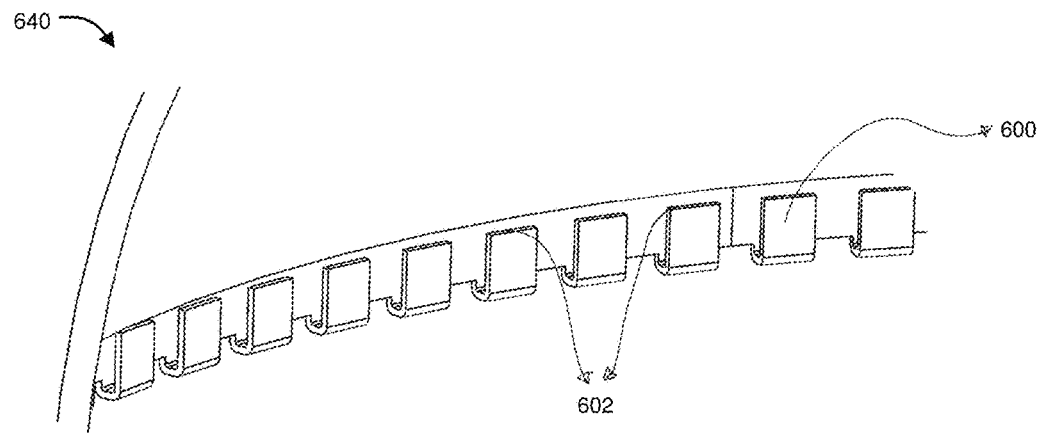
Figure 6D:
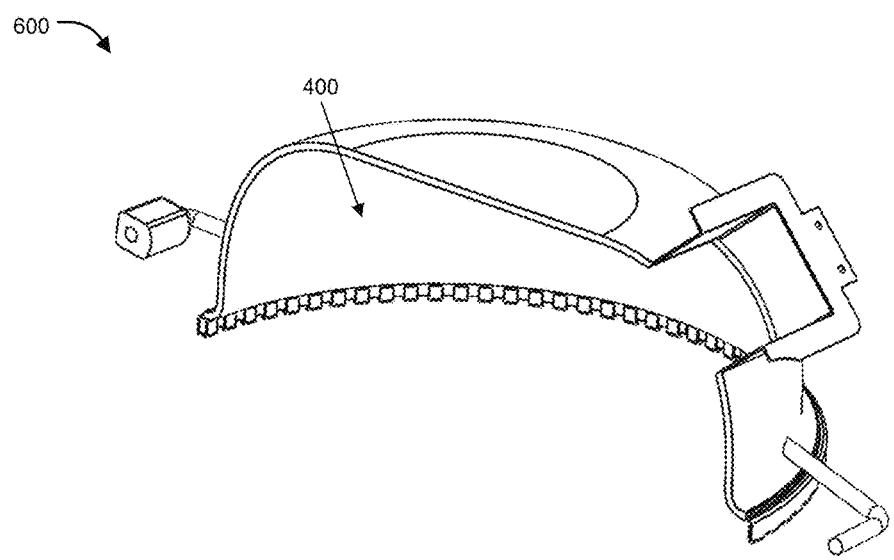

FIGS. 5A to 5D illustrate exemplary photographic representations of the proposed cooking apparatus 100 showing the enclosure 500 having the display 508 and a magnetron (not shown). The enclosure 500 is connected through a hinge with the top lid 400 having a handle 412. The top lid 400 covers the cooking container 300 (configured on a base 200) that too has a handle 306, and has a round profile to enable efficient circulation/reflection of microwaves. FIG. 5B illustrates another exemplary representation of the proposed cooking apparatus 100 having the heater coil 404 that is configured therein to enable convention and radiation based cooking from heat generated. FIG. 5C illustrates exemplary representation of the proposed cooking apparatus 100 with open flame based cooking, whereas FIG. 5D illustrates exemplary representation of the proposed cooking apparatus 100 with induction based cooking.

In an aspect, the cooking apparatus 100 can be controller remotely, say through an application configured on a mobile/smart phone where the temperate, mode (induction or convection or microwave or conduction), time duration/timer, among other cooking parameters can be controlled. As the proposed apparatus 100 has multiple sensors such as an IR camera and a moisture sensor, condition of the cooking and/or ingredients thereof can be evaluated/viewed in real-time and cooking parameters/attributes can be changed accordingly.

In an exemplary implementation, cooking apparatus 100 can operate both in the induction based cooking as well as modern technique of cooking, preferably microwave. Typical operation may start with an open position of the top lid 400 of the cooking apparatus 100 with the cooking ingredients being placed in the cooking container 300 and cooked in open. When the induction based cooking is to be performed in closed, the top lid 400 can simply be positioned on the cooking container 300 and the cooking can take place. When microwave based cooking is to be started, the initiation can be done through the display control configured on the enclosure 500 so as to activate the magnetron 502 and start the microwave action. It would be appreciated that the open position of the top lid 400 can allow cooking, mixing, adding, and browning of the ingredients, after which phase, the top lid 400 can be closed down and the operator can switch onto the microwave function to quickly complete cooking.

In an aspect, as mentioned above, round shape of the cooking container 300 can be ideal for reflections for microwaves inside the top lid 400 and the container 300, which supports and maximizes heating of the cooking container/pan 300.

In an aspect, the proposed apparatus 100 can include unified controls that allow induction/flame (bottom source of the apparatus 100) and top source (including fan, heater coil, microwave magnetron) to cook the food simultaneously. As mentioned in FIG. 6, controls for induction can be different from controls for microwave, whereas controls can also be provided for when both microwave and induction functionalities are to be performed simultaneously.

As mentioned above, the apparatus 100 can also act as an Internet of Things (IoT) device, and connected/controlled through any or a combination of Internet, Wi-Fi, and Bluetooth. As shown, the top lid 400 can further include a moisture sensor that senses the moisture content while the cooking is going on between the top lid 400 and the cooking container 300 such that when the moisture content goes below a defined threshold, a sprinkler 414 configured in the top lid 400 can sprinkle necessary/appropriate amount of water. A thermal sensor can also be configured to enable a thermal map to be defined for the food being cooked so that a user remote from the apparatus can be communicated about the state of the individual ingredients of the food. The top lid 400 can further include a smart PCBA (Printed Circuit Board Assembly) along with other sensors such as temperature sensor and an IR (infrared) camera.

Figure 7A:
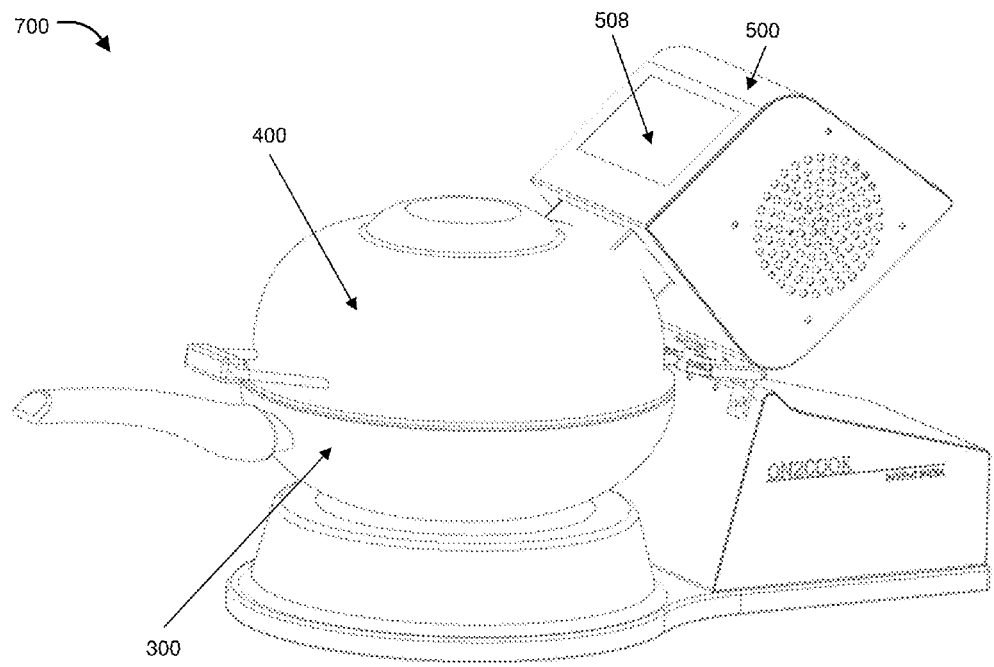
FIGS. 7A and 7B illustrate additional exemplary representations of the cooking apparatus according to an embodiment of the present invention.
Figure 7B:
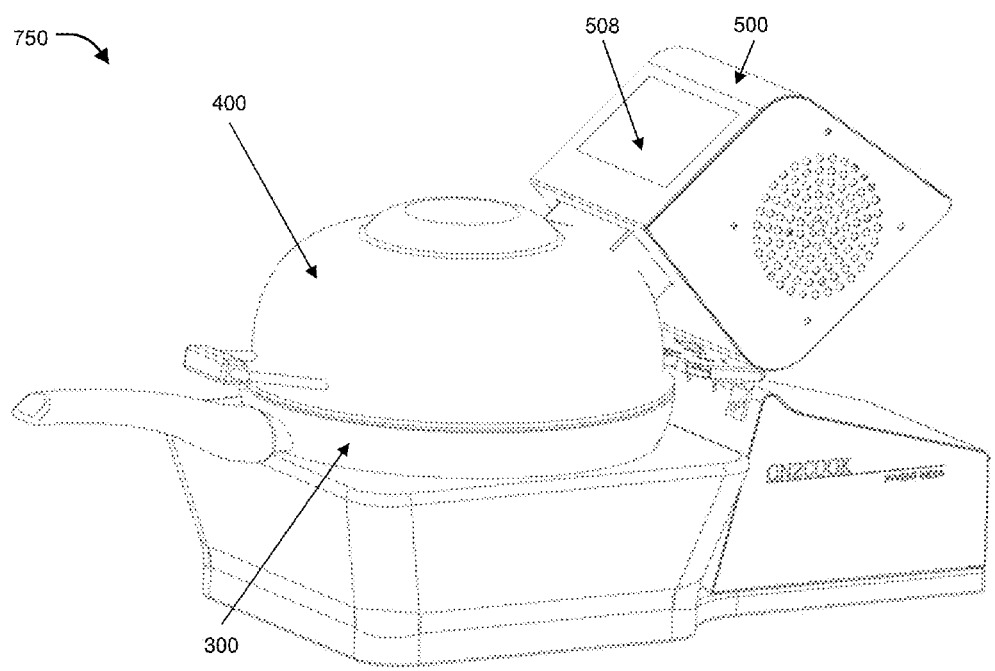

FIG. 7 illustrates a flat induction plate based cooking using the apparatus of the present invention. The top lid 400, as shown, can include a handle 412 to lift up and bring down the top lid 400. The top lid 400 can further include the heater coil to generate heat from convection, and the fan for convection heating. The hinge that connects the top lid 400 with the enclosure 500 counter-balances the weight of the enclosure so as to minimize the load on the handle 412 of the lid 400.

With reference to FIGS. 6A to 6D, exemplary structure of the top lid 400 is demonstrated, wherein the bottom end of the top lid 400 can include or be operatively coupled with a choke 600 that helps avoid leakage of microwaves. In an aspect, one or more choke tips 602 can be placed at less than one-fourth of wavelength, wherein the choke tips 602, together, short the microwaves that tries to escape out of the chamber formed between the top lid and the cooking container.

While in the foregoing specification a detailed description of an embodiment of the invention has been set down for the purpose of illustration, many variations in the details herein given may be made by those skilled in the art without departing from the spirit and scope of the invention.

It should be appreciated by those skilled in the art that various changes and modifications can be made to the illustrated embodiments without departing from the spirit of the present invention. All such modifications and changes are intended to be covered within the scope of the present invention disclosure.

The foregoing specific embodiments of the present invention as set forth in the specifications herein are for illustrative purposes only. Various deviations and modification may be made within the spirit and scope of this invention, without departing from a main theme thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

ADVANTAGES OF THE INVENTION

The present disclosure provides a cooking apparatus that combines benefits of both open flame/induction/convection/conduction and other modern cooking techniques cooking into a single apparatus.

The present disclosure provides a cooking apparatus that has multiple sensors configured to monitor state of cooking, control cooking conditions, time of cooking, control time of use of induction based cooking vs. microwave cooking, among many other configurable parameters.

The present disclosure provides a curved induction coil that matches the form factor of a curved/round cooking container so as to allow effective microwave reflections for optimal cooking.

The invention claimed is:

1. A cooking apparatus comprising:
   a base;
   a cooking container removably placed on the base, said removable cooking container being made of metal; and
   a top lid that is configured to cover the removable cooking container placed on the base, wherein the top lid is coupled with at least one magnetron that acts as a source of microwaves,
   wherein, the base is characterized as being a separate unit from the top lid, and incorporates any or a combination of an induction coil and a gas burner; and
   wherein a combination of the base and the top lid allows multiple modes of cooking of food in the removable container such that in at least a first configuration, covering of the removable cooking container by the top lid enables microwave cooking using the magnetron, and in at least a second configuration, the removable cooking container is used to enable any or a combination of induction or open flame cooking resulting in radiation, convection, and conduction cooking from outside and bottom side of the removable cooking container.

2. The cooking apparatus of claim 1, wherein the top lid comprises a fan and a heater coil to enable convection and radiation based cooking from heat generated.

3. The cooking apparatus of claim 2, wherein heating of the heater coil enables heat to travel through conduction between the top lid and the removable cooking container, enables convection through fan, and further enables natural radiation.

4. The cooking apparatus of claim 1, wherein the cooking container is of a hemispherical shape so as to enable reflection of microwaves inside the removable cooking container and the top lid for efficient cooking.

5. The cooking apparatus of claim 4, wherein the removable cooking container is supported by a curved induction coil that matches profile of the cooking container.

6. The cooking apparatus of claim 1, wherein the removable cooking container is integrated with the base.

7. The cooking apparatus of claim 1, wherein said cooking apparatus is configured to allow simultaneous and/or iterative use of any or a combination of induction, open flame, convection, conduction, and radiation cooking from outside and bottom side of the removable cooking container, and microwave and convection cooking from inside the cooking container.

8. The cooking apparatus of claim 1, wherein the magnetron forms part of an enclosure that comprises a plurality of vents for a fan that is configured in the enclosure.

9. The cooking apparatus of claim 8, wherein the top lid is coupled with the enclosure by means of a hinge.

10. The cooking apparatus of claim 8, wherein the enclosure comprises a temperature sensor configured to sense temperature thereof.

11. The cooking apparatus of claim 8, wherein said enclosure comprises a display to indicate and/or enable control of any or a combination of temperature, moisture, time, and a cooking parameter related to the cooking apparatus or a part thereof.

12. The cooking apparatus of claim 1, wherein the cooking apparatus is configured as a remotely operable apparatus through any or a combination of Internet, Wi-Fi, Bluetooth, Zigbee, and Near-Field Communication (NFC).

13. The cooking apparatus of claim 1, wherein the top lid comprises a moisture sensor configured to sense moisture level, and a sprinkler that sprinkles water when moisture level between the top lid and the cooking container reaches a defined threshold.

14. The cooking apparatus of claim 1, wherein the top lid comprises a thermal sensor that enables generation and presentation of a thermal map that defines cooking state of individual ingredients being cooked.

15. The cooking apparatus of claim 1, wherein the top lid further comprises an IR camera to enable viewing of individual ingredients being cooked.

16. The cooking apparatus of claim 1, wherein the top lid is coupled with two or more magnetrons so as to give additional power to the top lid for microwave action.

17. The cooking apparatus of claim 1, wherein the magnetron is water-cooled or air-cooled, and wherein weight of the magnetron counter-balances weight of the cooking apparatus so as to minimize load on a handle of the top lid.

18. The cooking apparatus of claim 1, wherein the cooking apparatus comprises a choke having a plurality of choke tips to avoid leakage of microwaves, and wherein the plurality of choke tips, together, short the microwaves that try to escape out of chamber formed between the top lid and the cooking container.

19. The cooking apparatus of claim 1, wherein any or a combination of the induction coil and the gas burner in the base provides a heat source to enable induction or open flame cooking respectively.

20. The cooking apparatus of claim 1, wherein the radiation, convection, and conduction is enabled both from top to bottom direction as well from the bottom to the top direction.

* * * * *